United States Patent [19]
Willcox

[11] Patent Number: 4,593,216
[45] Date of Patent: Jun. 3, 1986

[54] ROTARY STEPPING MOTOR HAVING IMPROVED CONSTRUCTION

[75] Inventor: Frederick P. Willcox, New Canaan, Conn.

[73] Assignee: IBM Business Machines Corporation

[21] Appl. No.: 422,937

[22] Filed: Sep. 24, 1982

[51] Int. Cl.$^4$ .............................................. H02K 37/00
[52] U.S. Cl. ........................................ 310/49; 310/266
[58] Field of Search ........................... 310/49, 266, 156

[56] References Cited

U.S. PATENT DOCUMENTS

| | | | |
|---|---|---|---|
| 2,627,040 | 1/1953 | Hansen | 310/49 |
| 2,837,670 | 6/1958 | Thomas et al. | 310/46 |
| 3,344,378 | 9/1967 | Wilhelmson | 310/49 X |
| 3,469,124 | 9/1969 | Willcox | 310/266 X |
| 3,855,560 | 12/1974 | Ward | 310/156 X |
| 3,904,902 | 9/1978 | Inariba | 310/266 X |
| 4,264,833 | 4/1981 | Stenudd | |
| 4,341,969 | 7/1982 | Sievert | |
| 4,439,703 | 3/1984 | Hino | |

*Primary Examiner*—Donovan F. Duggan
*Attorney, Agent, or Firm*—Hall, Myers & Rose

[57] ABSTRACT

An improved impulse-operated rotary stepping motor is constructed with a two-part stator assembly and coil support for each stage to reduce manufacturing costs, improve the magnetic characteristics, improve alignment of the rotor of each stage, provide for an integral bearing, make practical the construction of a motor having the rotor teeth on the inside of the rotor armature shell, and to improve and sharpen the detenting action when stopped by bilaterally stepping the top width of the rotor and stator teeth at least once along the length of each tooth.

28 Claims, 8 Drawing Figures

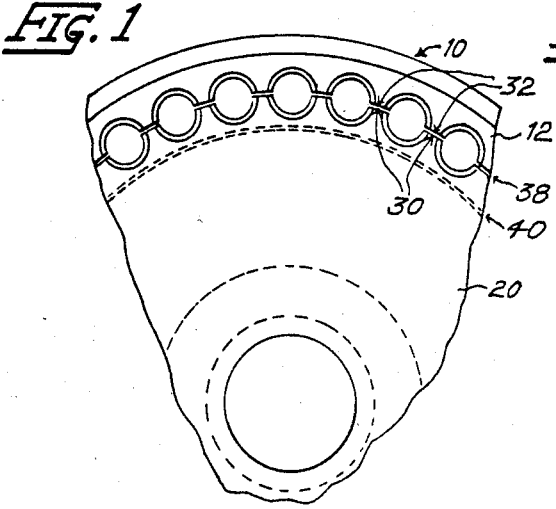
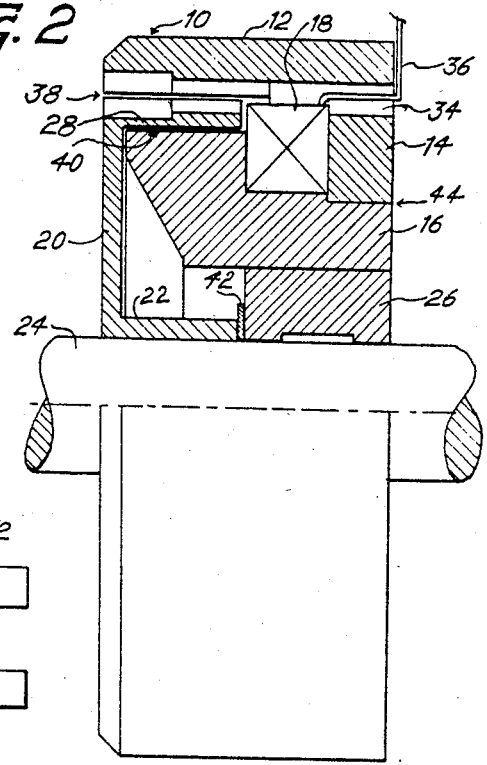
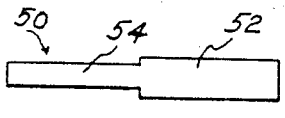
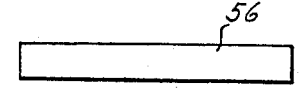
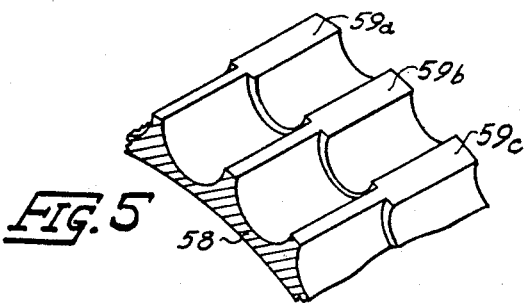
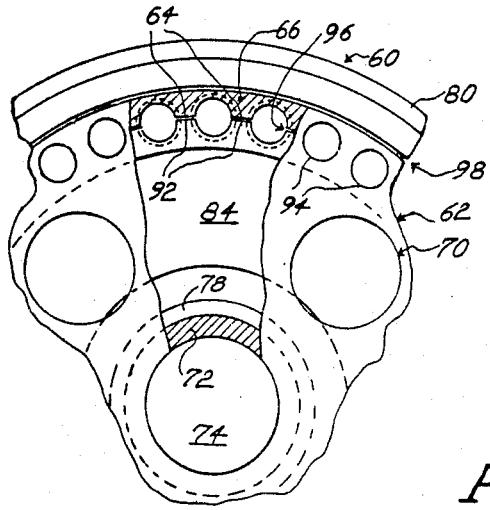
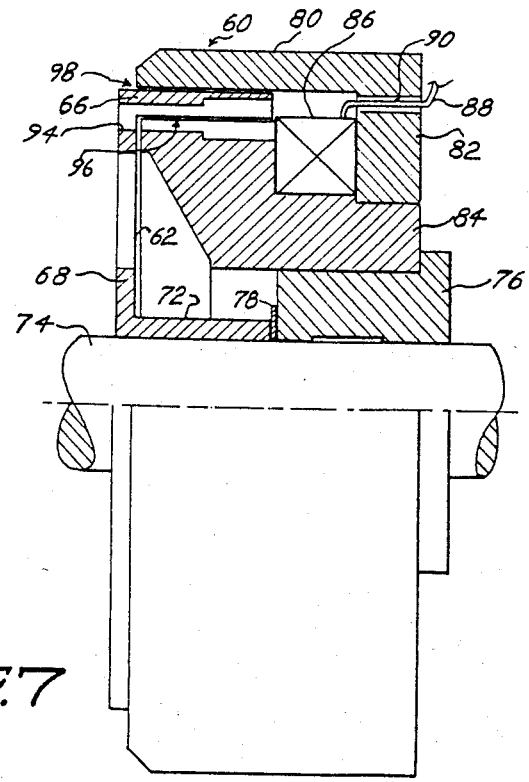

ROTARY STEPPING MOTOR HAVING IMPROVED CONSTRUCTION

BACKGROUND OF THE INVENTION

1. Field of the Invention

The improvements of this invention pertain to both impulse operated rotary electro-magnetic devices and to stepping motors.

2. Description of the Prior Art

Older prior art in stepping motors has employed some shaping of the rotor and/or stator teeth to establish a preferred direction of rotation when the motor is energized. Other art, particularly as applied to single rotary devices which operate through a limited angle of rotation, has employed rotor or stator tooth tips which vary in radius to reduce the working gap as the rotor and stator teeth come into coincidence to improve the torque characteristics. Varying the radius of both sides of the rotor and stator teeth has been employed in stepping motors to effect a reduction in cogging action but with a loss in sharpness of the detenting action when the motor is used to locate or precisely position an object such as a directly driven printing element.

One recent U.S. Pat. No. 4,264,833 Apr. 1981, Stenudd, employs the technique of tapering both ends or one end of each rotor tooth to achieve certain described advantages, particularly for high stepping frequencies. This tapering or bevelling, however, does not improve the sharpness of the detenting action as does the stepped tooth construction of this invention. Still another recent U.S. Pat. No. 4,341,969 July 1982, Sievert, shows notched teeth for reducing cogging but, like the Stenudd patent structure, is of no help in securing positive sharp detenting.

SUMMARY OF THE INVENTION

Improved detent sharpness and an improved torque output curve for each step of a rotary actuator or stepping motor is obtained by equally and symmetrically stepping the tips of the rotor and stator teeth in an axial direction. While the peak stall torque is reduced by this stepping, the total work done per step for a given excitation is not necessarily lowered because the torque curve peak is considerably broadened and has, in effect, two peaks. Further, this broadening of the torque output curve tends to smooth the output and, if the connected load is at all resilient, torsional oscillation or surging is reduced.

The wide portion of each stepped tooth is about double the width of the narrower portion.

To facilitate fabrication of stators having stepped teeth, the stators are divided into a circularly configured inner pole which also supports the coil, and a concentric cup-like outer pole structure having a precision aperture in the rear (or bottom) wall. This coil-bearing center pole is pressed into this aperture. If a light press fit is obtained, the joint between the center and outer pole structures ceases to be an additional equivalent magnetic air gap in the magnetic flux path. The rotor shaft bearing is preferably formed as an integral part of the center pole to aid in maintaining tight concentricity tolerances.

The inner or center pole and the outer pole are in separate pieces, permitting the coil to be provided on the center pole before the coil-bearing center pole is pressed into the aperture in the outer pole as aforesaid.

This two-part construction of the stator also makes it practical to built a rotary actuator or stepping motor with the rotor teeth on the inside of the rotor shell and cooperating stator teeth on the periphery of the center pole piece. This inside-out structure has both magnetic and manufacturing advantages.

DESCRIPTION OF THE DRAWINGS

FIG. 1 is a partial plan view of a single rotor-stator unit according to the invention, with the rotor and stator teeth in full alignment with each other which is the detent position when the rotor is not rotating and is held locked up by minimum energization of the coil.

FIG. 2 is a vertical view, quarter-sectioned, of the FIG. 1 rotor-stator unit.

FIG. 3 is a top view of a stepped stator or rotor tooth as used by this invention.

FIG. 4 is a top view of a conventionally used tooth.

FIG. 5 is an isometric section showing three bilaterally stepped rotor teeth such as those used in the unit shown in FIGS. 1 and 2.

FIG. 6 is a partial plan view of a single rotor-stator unit showing alternate construction with the rotor teeth on the inside of the rotor armature shell and the stator teeth on the center pole. A portion of the rotor is broken away to show the underlying construction.

FIG. 7 is a vertical quarter-sectioned view of the FIG. 5 unit.

DETAILED DESCRIPTION

Figure 8:
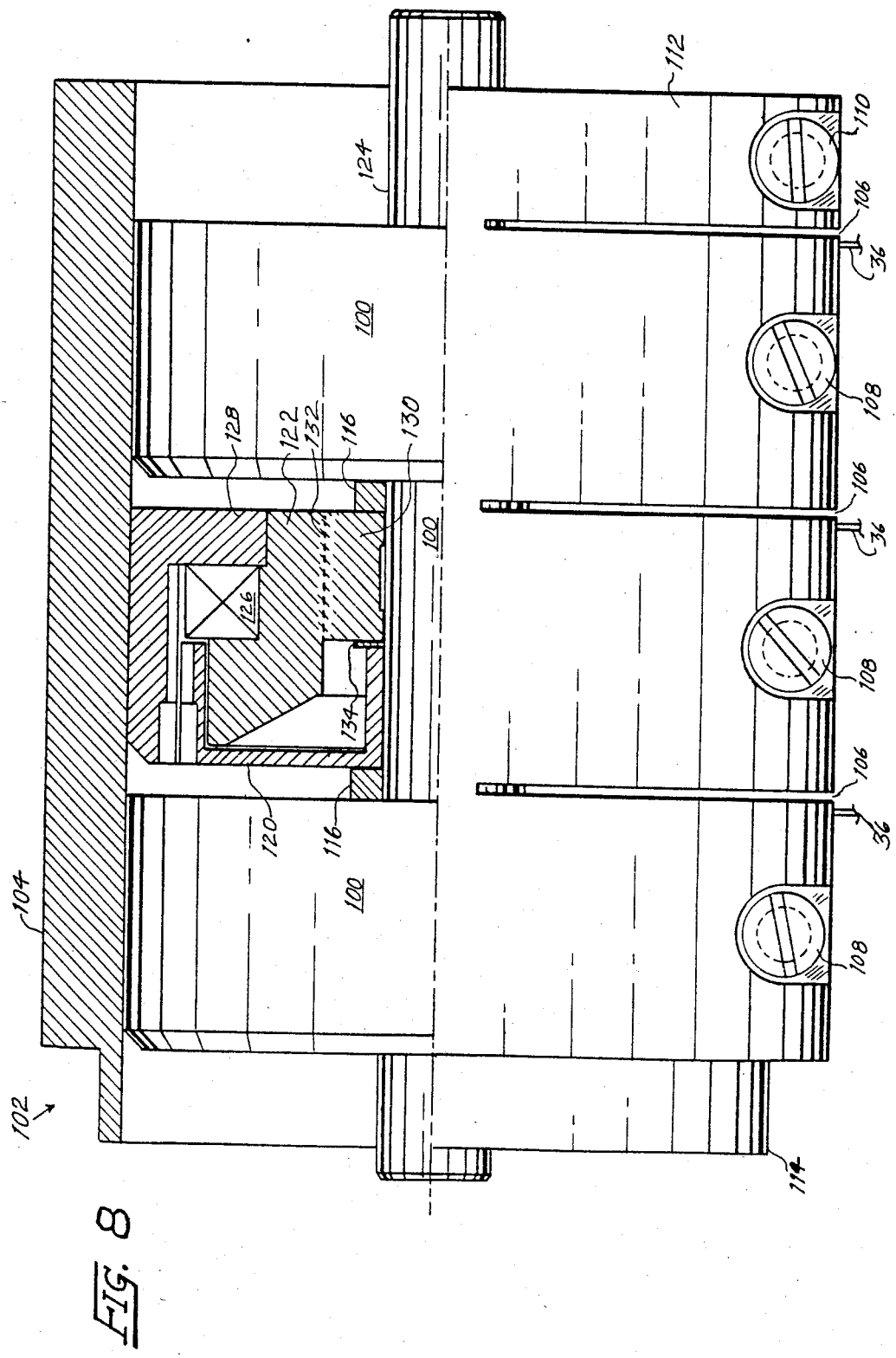
FIG. 8 is a partially cross-sectioned side view of a three phase stepping motor using three units such as shown in FIGS. 1 and 2 with the stators having an integral bearing construction.

The improvements of this invention are specifically intended for use in a stepping motor of the type shown in my U.S. Pat. No. 3,469,124 Sept. 23, 1969, "Multistage Impulse Operated Rotary Stepping Motor" which is incorporated herein by reference. This prior invention provides an armature or rotor shell having a thin outwardly toothed rim operating in an inwardly toothed annulus in the face of a circulator stator with the coil in the bottom of this annulus or groove. Inasmuch as the rotor and stator teeth are of matching configuration, (much like gear teeth), the torque output peaks sharply as the edges of the rotor teeth align with the cooperating edges of the stator teeth. Thus when the prior construction is used in a stepping motor having three or four so-called phases, the cogging action is quite pronounced at low rotational speeds, the torque building rapidly to a sharp peak at the tooth edge alignment point and then tapering off to near zero as the teeth of the rotor come into full matching alignment with the stator teeth. This referenced invention also shows two forms of construction which are not too practical for volume production using powder metallurgy techniques because the re-entrant stator center pole is difficult to form, and also, as shown in FIG. 3 of that patent, requires a third ring-shaped stator member forming part of the center pole which has a coil groove cut into it.

Referring to the drawings, FIGS. 1 and 2 show an improved preferred construction for an electromagnetic device having a rotor and stator assembly made of a soft magnetic material such as iron. The particular unit shown represents one single unit of the two to four that would be required to make up a rotary stepping motor. The proportions shown are approximately those required for units having an outside diameter of 1 inch (25 mm) and thirty-two teeth as would be required for a so-called three phase stepping motor which provides 96 steps per revolution. The armature or rotor shell is shown in the pulled-in position with the rotor teeth in line with the stator teeth. Both rotor and stator teeth are shown with stepped teeth in this construction.

The electro-magnetic device incorporating the preferred embodiments is indicated by the numeral 10. The stator assembly has a cup-like body 12 with an apertured bottom wall 14 fitted onto a circularly configured stator center pole 16 which supports a simple solenoid winding, coil 18, which may be wound on a bobbin. A rotor 20 has a hub 22 which is pressed onto a shaft 24 which, in turn, is journalled in a bearing 26 fitted into center pole 16. The outward surface of the rotor 20 has a thin tubular rim, designed as armature shell 28, which is formed, in the example shown, with a plurality of thirty-two teeth 30 evenly spaced about the periphery of armature shell 28. The inward-facing circular surface of the stator body 12 is similarly toothed as at 32, at least in the axial region corresponding to rotor teeth 30. The body 12 may have a hole 34 generally in line with the space between two of the stator teeth, through which the leads 36 to coil 18 may extend.

When used as a stepping motor, the wider tooth portion 52 provides high torque to move rotor 20 to a desired position, while narrow tooth portion 54 holds rotor 20 accurately in that position.

The rotor teeth 30 and the stator teeth 32 are stepped as shown in FIG. 3 by tooth 50, but could be left straight as shown by the tooth 56 in FIG. 4. Referring again to FIGS. 1 and 2, the running or working gap between the rotor and stator teeth is indicated at 38. This working gap 38 is very small and is most desirably held to less than 0.001 inch (0.025 mm) for maximum torque. The non-working gap 40 between the inside of rotor shell 28 and the corresponding circular surface on the center pole 16 can be between 0.001 and 0.002 inches (0.025 to 0.05 mm) for maximum torque.

The rotor 20 is axially positioned in the stator assembly by hub 22 pressing against thrust washer 42 which can rotate against bearing 26. The electromagnetic forces normally hold the rotor hub against thrust washer 42. Axial movement of the shaft 24 in the opposite direction can be limited by a "C" ring as at 32 in FIG. 2 of the referenced patent, or by any well-known means as appropriate depending upon whether the device 10 is used singly with fewer and wider teeth, ten for example, as a rotary actuator, or whether two or more devices 10 are used to make up a stepping motor.

The bearing 26 may be an integral part of center pole 16 to secure improved concentricity tolerances by eliminating the separate inserted bearing, be it a plain type as shown or a ball bearing. When the stator center pole 16 is made of sintered powdered iron and the bearing is integral therewith, the bearing portion 26 would be fabricated with a lower density so that it can be impregnated with oil for lubrication. Any change in the inductance of the device 10 by having this additional iron adjacent the nominal mean magnetic path would be small and have little, if any effect upon high speed performance. If an integral bearing construction is used, it is desirable to use a shaft of non-magnetic stainless steel.

The stator body 12 is desirably a press fit onto the center pole 16, with the circular aperture in bottom wall 14 and the circular mating area on the center pole 16 being fabricated to give an interference fit of 0.0002 to 0.0005 inch (0.005 to 0.012 mm) for example. This amount of interference does not appreciably affect the outside diameter of stator body 12 or the bearing fit on the shaft 24. The fit of bearing 26 on shaft 24 is held to a nominal 0.0003 inch (0.0075 mm) loose. While the body 12 can be a tight hand fit onto pole 16, the joint 44 therebetween would then represent a magnetic gap equivalent to an air film of about 0.0014 inches (0.035 mm) in the flux path. If the mating surfaces are smooth and assembled to give a reasonable compressive stress this undesirable equivalent gap is eliminated from the flux path. It should be further noted that the minimum cross-section areas in the stator body 12 and its bottom wall 14, and center pole 16 should not be less than the total top area of the rotor or stator teeth for best stall torque with the iron saturated.

FIG. 3 shows the top of one stepped tooth 50 which has a single step approximately midway of its axial length. For a normal high performance three phase motor for example, the wide portion 52 of the tooth top 50 would be made about equal to or slightly less than the angle subtended by one motor step. In the case of a 96 step motor this would be 3.75°. The narrower portion 54 of the tooth top would be made to subtend a little more than one-half the step angle or about 2° for the 96 step motor. Other proportions and step widths can be used to change the operating characteristics. The smaller the angle subtended by the narrow portion 54, the "sharper" the angular detenting action of the device when energized with a holding current while not running.

FIG. 4 shows the top of a parallel-sided tooth 56 of the conventional type as shown and used in my referenced patent.

FIG. 5 shows an isometric partial section of a rotor armature shell 58 with three stepped teeth 59a, 59b, and 59c such as the stepped teeth on rotor 20 in FIGS. 1 and 2 with the bilateral stepping being carried down into the root area of the teeth. Coacting stator teeth would be equally stepped.

In FIGS. 6 and 7 which show an alternate preferred embodiment, the rotary electromagnetic device is generally designated by the numeral 60. Device 60 is different from device 10 in that it incorporates a rotor 62 having teeth 64 on the inside surface of the thin tubular shell 66. Rotor 62 has a web 68 with a plurality of lightening holes 70 which also reduce some fringing flux leakage if the rotor web 68 is integral with rotor shell 66 or otherwise made of a soft magnetic material. The rotor hub 72 is pressed onto shaft 74 which is journalled in bearing 76 and separated therefrom by a thrust washer 78 as previously described.

A stator body 80 having a circularly apertured bottom wall 82 is, as previously described for device 10, pressed onto a circular mating area on the stator center pole 84. The simple coil 86 is supported on pole 84 and, of course, securely retained when the body 80 is pressed onto pole 84. The leads 88 to coil 86 may be brought out through a hole 90 in bottom wall 82, or through an axial slot, not shown, in body 80 to facilitate assembly.

The stator center pole 84 has teeth 92 evenly spaced around its larger diameter area. Here again, the rotor teeth 64 and the stator teeth 92 are stepped for improved torque characteristics. As can be seen in FIGS. 6 and 7, the rotor web 68 is also desirably perforated by circular or other shaped holes 94 in the areas between each of the teeth 64. This is done to reduce fringing flux losses. The working gap 96 between the rotor teeth 64 and stator teeth 92 is made very small as previously described for device 10. The non-working gap 98 between the outside surface of the rotor shell 66 and the inside circular surface of the stator body 80 is also configured to the previously suggested dimensions.

Device 60, as shown in FIGS. 6 and 7, is also shown configured with 32 teeth as one unit of a 96 step three phase motor, and is in the proportions for a stator body 80 having an outside diameter of about 1 inch (25 mm). One advantage of this inside-out construction is that the non-working gap 98 has a proportionately much larger area than that of device 10 resulting in a lower total reluctance for the non-working gap in a manner similar to enlarged pole pieces on a horsehoe or "U" shaped electromagnet. The inside-out design of device 60 lends itself to lower cost fabrication for some manufacturing techniques than the more conventional construction of device 10. Concentricities between the stator assembly and the rotor are generally easier to maintain. The flux density in the tooth area tends to be higher.

FIG. 8 shows three of the rotor-stator combinations such as device 10 in FIGS. 1 and 2, combined into one housing to form a three phase stepping motor as indicated generally by the numeral 102. Motor 102 has a heat sink housing 104 which retains three devices 100 which have been pre-assembled on a shaft 124. Housing 104 is partially divided into four segments by slots 106, and is axially slotted, not shown, so that each device 100 can be clamped into working position by respective screws 108. Screw 110 is used to clamp the shorter segment 112 onto a motor mounting which can be part of the driven mechanism. Housing 104 is necked down as indicated by extension 114. This extension 114 is nominally used to support an optical commutator, the rotary member of which would be supported on the lefthand end of shaft 124. Each device 100 has a rotor 120 pressed onto shaft 124. A stator center pole 122 which supports a coil 126 is pressed into a stator cup 128. Center pole 122 has an integral bearing area 130 which, if the center pole is made of a powdered iron or other suitable soft center pole material, is of a lower density than the balance of the center pole 122. The approximate line of demarkation between the lower density and the maximum density area is indicated by dotted line 132. Thrust washers 134 separate rotors 120 from the bearing areas 130. To maintain sufficient magnetic separation and uniform spacing of the three devices 100 during assembly into housing 104, thick separator washers 116 are used. The material used for washers 116 is selected so as to be suitable for rotation against the respective bearing areas 130. Stator cups 28 and rotors 120 are phase oriented in housing 104 so that a normal 1-2-3 or 3-2-1 sequence of energizing for equivalent direction of rotation can be maintained. One such assembly orientation is shown in FIGS. 5, 6, and 7 of the referenced U.S. patent. As also shown in that patent in FIG. 4, two devices 100 of this invention can be assembled back to back in housing 104.

Rotary stepping motors or single unit actuators using the embodiments shown and described herein can be made up in various different forms without departing from the scope of this invention. For example, referring to FIG. 2, the circular aperture in bottom wall 14 of stator body 12 can be made as large in diameter as the main inside surface of body 12, and the mating surface of the center pole 16 increased in diameter to match for the proper press fit, with the coil 18 then being directly wound in a groove cut in center pole 12. Further, the rotor hub 22 may extend outward, opposite from that shown in FIG. 2. In this case the bearing area for shaft 24 can be moved directly under the tooth area to more effectively resist eccentric magnetic forces which can be large if looser running fits and larger gaps are employed in less critical or lower performace designs. Also the coil 18 could be supported by its periphery in stator body 12.

Further, the stator outer poles and inner or center poles may be axially slotted to somewhat reduce eddy currents therein for a small gain in stepping and free running speeds.

I claim:
1. In an electromagnetic device;
   a stator of magnetic material having first and second parts;
   said first part comprising (a) a first cylindrical portion constituting a center pole and having an outer diameter, and (b) a second cylindrical portion of smaller outer diameter than said outer diameter of said first cylindrical portion; said first and second cylindrical portions being integral with each other;
   said second part comprising a first cylindrical portion having an inner diameter substantially greater than said outer diameter of said first cylindrical portion of said first part, to form (a) an outer pole, (b) a fist annular space between said center and outer poles, and (c) a second annular space between said center pole and said outer pole;
   said second annular space being defined by said second cylindrical portion of said first part and said first cylindrical portion of said second part,
   a rotor of magnetic material mounted for rotation in said first annular space;
   each of said rotor and said stator having complementary teeth, the rotor teeth and the stator teeth being spaced apart to form a working air gap between them, and
   a cylindrical coil located in said second annular space and on said second cylindrical portion of said first part, said cylindrical coil having an inner diameter, said coil having two sides, the first side being the side of said coil closest to said first annular space and the second side being the other side of said coil;
   said first part extending from a position contiguous with said first annular space, through said cylindrical coiland for a substantial distance beyond said second side of said coil;
   said second part having a second cylindrical portion which is integral with said first cylindrical portion of said first part and which extends to and is contiguous with the portion of said first part which extends said substantial distance beyond said coil;
   said second cylindrical portion of said second part having an inner diameter no greater than the inner diameter of said coil, and the portion of said first part which extends for said substantial distance having an outer diameter no greater than the inner diameter of said coil.
2. In an electromagnetic device as defined in claim 1;
   means for performing a stepping operation comprising a plurality of devices as defined in claim 1.
3. In an electromagnetic device as defined in claim 1:
   said rotor having two sides, the first of which sides faces said center pole and the other of which sides faces said outer pole,
   said rotor having teeth on only one of said sides.
4. In an electromagnetic device as defined in claim 3:

said rotor having teeth on only that one of its sides which faces the outer pole.

5. In an electromagnetic device as defined in claim 4: the space between said rotor teeth and the outer pole being no greater than 0.001 inches and the space between the rotor and the center pole being no greater than 0.002 inches.

6. In an electromagnetic device as defined in claim 3: said rotor having teeth on only that one of its sides which faces the center pole.

7. In an electromagnetic device as defined in claim 6: the space between said rotor teeth and said center pole being no greater than 0.001 inches and the space between the rotor and the outer pole being no greater than 0.002 inches.

8. In an electromagnetic device as defined in claim 1; the rotor teeth cooperating with the pole facing the rotor teeth to form a working gap, said working gap being no greater than 0.001 inches.

9. In an electromagnetic device as defined in claim 8: the space between the rotor and the other of said poles forming a non-working gap, said non-working gap being no greater than 0.002 inches.

10. In an electromagnetic device as defined in claim 1: a shaft supporting said rotor, a bearing between said shaft and said first part, said bearing being integral with said first cylindrical portion of said first part.

11. In an electromagnetic device as defined in claim 10: said bearing and said first cylindrical portion of said first part being composed of powdered magnetic material.

12. In an electromagnetic device; a stator of magnetic material having first and second parts; said first part comprising a first cylindrical portion constituting a center pole and having an outer diameter, said second part comprising a first cylindrical portion having an inner diameter substantially greater than said outer diameter of said first cylindrical portion of said first part, to form (a) an outer pole, and (b) an annular space between center and outer poles, a rotor of magnetic material mounted for rotation in said annular space and about an axis; said rotor and said stator each having teeth, the rotor teeth and the stator teeth coacting with each other and being spaced apart to form a working air gap between them, and a cylindrical coil extending around a portion of said stator and comprising means for establishing magnetic flux between said center pole and said outer pole and across said working air gap, each rotor tooth and each stator tooth having two distinct portions which taken together form a stepped tooth; the first portion of each stepped tooth being relatively wide, measured in the direction of movement of the tooth, as compared to the width of the second portion; and the second portion of each stepped tooth being relatively narrow, measured in the direction of movement of the tooth, as compared to the width of the first portion, the wide portions of the rotor teeth coacting with the wide portions of the stator teeth, the narrow portions of the rotor teeth coacting with the narrow portions of the stator teeth, the total number of wide portions of the rotor teeth being equal to the total number of narrow portions of the rotor teeth, the total number of wide portions of the stator teeth being equal to the total number of narrow portions of the stator teeth.

13. In an electromagnetic device as defined in claim 12: means, including said teeth, for stopping said rotor in a desired position, in which the rotor and stator teeth are aligned with each other, and holding said rotor in that position, the first portions of the rotor teeth cooperating with the first portions of the stator teeth to provide greater torque for rotating the rotor than would be available if said first portions of the rotor and stator teeth were as narrow as the second portions of said rotor and stator teeth, and the second portions of the rotor teeth cooperating with the second portions of the stator teeth to thus position the rotor with greater accuracy than would be available if said second portions of the teeth were as wide as the first portions of the teeth.

14. In an electromagnetic device as defined in claim 12: means for performing a stepping operation comprising a plurality of devices as defined in claim 13.

15. In an electromagnetic device as defined in claim 12: said rotor having two sides, the first of which sides faces said center pole and the other of which sides faces said outer pole, said rotor having teeth on only that one of its sides which faces the outer pole.

16. In an electromagnetic device as defined in claim 15: the space between said rotor teeth and the outer pole being no greater than 0.001 inches and the space between the rotor and the center pole being no greater than 0.002 inches.

17. In an electromagnetic device as defined in claim 12: said rotor having two sides, the first of which sides faces said center pole and the other of which sides faces said outer pole, said rotor having teeth on only that one of its sides which faces the center pole.

18. In an electromagnetic device as defined in claim 17: the space between said rotor teeth and said center pole being no greater than 0.001 inches and the space between the rotor and the outer pole being no greater than 0.002 inches.

19. In an electromagnetic device as defined in claim 12: said first portions of said teeth having a width, in the direction of rotation, about double the width of the second portions of the teeth.

20. In an electromagnetic device as defined in claim 19: the rotor teeth cooperating with the pole facing the rotor teeth to form a working gap, said working gap being no greater than 0.001 inches.

21. In an electromagnetic device as defined in claim 20: the space between the rotor and the other of said poles forming a non-working gap, said non-working gap being no greater than 0.002 inches.

22. In an electromagnetic device:
first and second magnetic devices one rotating relative to the other, and forming an annular air gap between said devices, each of said magnetic devices having projecting teeth of magnetic material,
said devices producing magnetic flux across said air gap, and
means, including said teeth, for providing said rotation and for stopping the rotation and positioning one of said devices at a predetermined angle relative to the other one,
each magnetic tooth having first and second sections, the first section having a width, measured in the direction of movement, greater than the width, measured in the direction of movement, of the second section,
the teeth on said second device having a configuration which matches the configuration of the teeth on the first device so that the first sections of the teeth on said first device cooperate with the first sections of the teeth on said second device, and the second sections of the teeth on said first device cooperate with the second sections of the teeth of the second device.

23. In an electromagnetic device as defined in claim 13:
the space between the teeth on said first device and the teeth on said second device constituting a working air gap,
said working air gap being not greater than 0.001 inches.

24. In an electromagnetic device as defined in claim 13, in which the first and second sections of each tooth are contiguous with each other and are of about equal length.

25. In an electromagnetic device as defined in claim 13:
said first magnetic device comprising a center pole and an outer pole with an annular gap between said poles,
said second magnetic device comprising a rotor rotating in said annular gap.

26. In an electromagnetic device as defined in claim 25:
the space between the teeth on said first device and the teeth on said second device constituting a working air gap,
said working air gap being not greater than 0.001 inches, the first and second sections of each tooth being contiguous with each other and of about equal length.

27. In an electromagnetic device as defined in claim 13:
each first section of each of said teeth having a width, measured in the direction of movement, about double the width, measured in the direction of movement, of each second section.

28. In an electromagnetic device as defined in claim 1, a rotatable shaft supporting said rotor,
said first part comprising powdered metal having a bearing portion contiguous with said shaft, said bearing portion including a friction reducing substance, whereby to reduce friction at the bearing.

* * * * *